US009575192B1

(12) United States Patent
Ng et al.

(10) Patent No.: US 9,575,192 B1
(45) Date of Patent: Feb. 21, 2017

(54) OPTICAL CHANNEL REDUCTION METHOD AND APPARATUS FOR PHOTODETECTOR ARRAYS

(71) Applicant: FMI Medical Systems Co., Ltd., Zhejiang (CN)

(72) Inventors: Johnny S. Ng, Kettering, OH (US); Piyush J. Shah, Beavercreek, OH (US); Xiaoxu Niu, Centerville, OH (US)

(73) Assignee: FMI Medical Systems Co., Ltd. (CN)

( * ) Notice: Subject to any disclaimer, the term of this patent is extended or adjusted under 35 U.S.C. 154(b) by 0 days.

(21) Appl. No.: 15/184,420

(22) Filed: Jun. 16, 2016

(51) Int. Cl.
*G01T 1/20* (2006.01)
*G01T 1/29* (2006.01)
*G01T 1/164* (2006.01)

(52) U.S. Cl.
CPC ............. *G01T 1/2985* (2013.01); *G01T 1/164* (2013.01); *G01T 1/20* (2013.01); *G01T 1/2002* (2013.01); *G01T 1/2018* (2013.01)

(58) Field of Classification Search
CPC .................................. G01T 1/20; G01T 1/164
USPC ............................. 250/362, 361 R, 366, 367
See application file for complete search history.

(56) References Cited

U.S. PATENT DOCUMENTS

| 5,912,578 | A | 6/1999 | Bird |
| 8,822,931 | B2 | 9/2014 | Laurence et al. |
| 2002/0121604 | A1* | 9/2002 | Katagiri .................... G01T 3/06 250/368 |
| 2013/0211233 | A1* | 8/2013 | Yamaya ................. A61B 5/055 600/411 |
| 2013/0256537 | A1* | 10/2013 | Laurence .............. G01T 1/1644 250/362 |
| 2014/0299777 | A1 | 10/2014 | Oleinik et al. |

OTHER PUBLICATIONS

TN—"Readout Methods for Arrays of SiPM".
Shih,Y.C.et al., "An 8 × 8 Row-Column Summing Readout Electronics for Preclinical Positron Emission Tomography Scanners", 2009 IEEE Nuclear Science Symposium Conference Record, pp. 2376-2380.
Yeom, J.Y. et al., "Side readout of long scintillation crystal elements with digital SiPM for TOF-DOI PET", Medical Physics 41, 122501 (2014);doi: 0.1118/1.4901524.

(Continued)

*Primary Examiner* — David Porta
*Assistant Examiner* — Meenakshi Sahu
(74) *Attorney, Agent, or Firm* — Fishman Stewart PLLC (57) ABSTRACT

A PET scanning system includes a plurality of detector modules, each having an array of pixelated scintillators, the array having N rows of pixelated scintillators, and M columns of pixelated scintillators. Each detector module includes a first set of N light guides optically coupled to the top surface that accumulate optical signals, and a second set of M light guides optically coupled to the bottom surface that accumulate optical signals. Each light guide is coupled to a light sensor which converts optical signals into analog electrical outputs. A processor is coupled to outputs from the first set and the second set, the processor configured to determine which pixelated scintillator within the array had a gamma ray interact therewith, and its depth of interaction, based on the outputs. Thus, gamma ray detection in an array of M×N scintillator pixels is accomplished using only M+N channels.

20 Claims, 6 Drawing Sheets

(56) References Cited

OTHER PUBLICATIONS

Goertzen, A.L. et al., Member, IEEE et al., "Design and Performance of a Resistor Multiplexing Readout Circuit for a SiPM Detector", IEEE Transactions on Nuclear Science, vol. 60, No. 3, Jun. 2013.

Raylman, R.R. et al., "A large area, silicon photomultiplier-based PET detector module", Nuclear Instruments and Methods in Physics Research A 735 (2014) 602-609.

David, S. et al, "A symmetric resistive voltage division circuit for SiPM array readout".

\* cited by examiner

OPTICAL CHANNEL REDUCTION METHOD AND APPARATUS FOR PHOTODETECTOR ARRAYS

TECHNICAL FIELD

This disclosure relates generally to diagnostic imaging and, more particularly, to an apparatus and method of reducing overall readout channel count in positron emission tomography (PET).

BACKGROUND

PET is a functional imaging technique in nuclear medicine that produces a three-dimensional image of functional processes in a living subject. Typically, a short-lived radioactive tracer isotope, such as fluorodeoxyglucose (FDG), is injected into the subject, where it becomes concentrated in a tissue of interest. As the radioisotope undergoes positron emission decay (also known as beta decay), it emits a positron (an antiparticle of the electron and having an opposite charge). The positron travels for a distance that is typically less than 1 mm (dependent on the type of isotope), during which time it loses kinetic energy. Once sufficiently decelerated it can interact with an electron. The electron and positron annihilate, which produces a pair of annihilation photons that move in approximately opposite directions. A significant fraction of the electron-positron annihilations results in two gamma rays or photons at 511 keV, emitted at approximately 180° apart and along a straight line of response (LOR) to pixelated gamma ray detectors that are positioned around the subject. The two gamma photons are detected within a certain coincidence timing window. With an appropriate time-resolution of detected pairs of gamma rays, the time-of-flight may be determined for each coincident event, which may be used to determine the location of the annihilation event. An image is generated based on the acquired gamma energy and hit-location data.

Statistics are obtained for many thousands of coincidence events. Typically, the coincidence events may be grouped into projection images, called sinograms. Known reconstruction techniques such as filtered back projection (FBP) may be used to reconstruct images from the projection images, resulting in a map that shows tissues in which the tracer has become concentrated, which can be interpreted by a physician or radiologist in the context of supporting a diagnosis or treatment for the subject.

PET is used for both medical and research applications. For instance, it may be used in clinical oncology to study tumors and search for metastases, or for clinical diagnosis of brain diseases. PET is also used to map brain and heart function, or to support drug development. PET is capable of detecting areas of molecular biology detail and may be used in a dedicated scanner.

Typically, such a scanner includes a patient table that provides for placement of the patient within the proper proximity of a bank of pixelated gamma ray detectors. Commonly, the bank of gamma ray detectors is positioned over 360° of the patient. The detectors convert incoming pairs of gamma rays to a light signal, which are then converted to electrical signals and processed in a data acquisition system. The processed data is passed to a computing device for imaging reconstruction. The amount of information obtained for imaging may be based on factors that include system noise. Noise may be generated, in one example, in which scatter occurs within the subject (where photons are deflected). In another example, noise may be generated based on random events in which two photons originating from two different annihilation events are incorrectly attributed to the same event—thereby incorrectly recorded as a coincidence pair arriving within the timing window.

A PET system may include a dedicated PET scanner, or may be combined with other known imaging modalities such as computed tomography (CT) or magnetic resonance imaging (MRI). In combined systems, both metabolic and anatomic information may be co-registered to provide combined information about both structure and biochemical activity.

Traditional PET detectors typically include arrays that are segmented scintillator pixels, each with a cross-section of approximately 10 $mm^2$, in one example, coupled to photomultiplier tubes with couple centimeter diameters. Because of the mismatch in scintillator and photomultiplier sensitive areas, signal analysis methods such as "Anger logic" are commonly used to determine the gamma ray hit position. Anger logic is a procedure to obtain the position of incidence of a photon on the scintillator, which includes connecting photomultiplier outputs to a resistive network to obtain only four outputs. With these signals or outputs, the 2-dimensional position of the scintillation centroid is obtained using a simple geometric formula. However, the resulting spatial image typically shows large distortions and non-uniform energy resolution across the sensitive area.

Recent detector technology employs a photosensor called Silicon Photomultipliers (SiPM) that includes an array of avalanche photodiodes with total sensitive area matching the scintillator pixel. An avalanche photodiode (APD) is a highly sensitive semiconductor electronic device that exploits the photoelectric effect to convert light to electrical signal. A SiPM operates at high speeds and high gain by applying a reverse bias voltage (typically 100-200 V but in some cases as low as 26 to 30 V), and shows an internal current gain effect, a factor of one million in one example. The one-on-one SiPM-scintillator pixel coupling configuration provides excellent timing resolution and highly uniform energy resolution across the sensitive area. But because each pixel element convers a small area of a few $mm^2$, a whole-body PET scanner based on this technology involves many tens of thousands of detector channels.

The electronic readout of the large number of SiPM detector channels is handled either by application specific ICs (ASICs) or by some type of electronic channel-reduction circuits. In an alternative, frontend electronics based on discrete components mounted on conventional printed circuit boards (PCBs) can be used. Currently the general approach is to use a resistive (or capacitive) network to derive weighted sums of the detector elements, which can be used to determine a hit position of the gamma ray. The drawback is that the timing and energy resolutions are degraded due to the large (summed) detector capacitance and noise. Another approach employs delay-line switched network architecture together with a field-programmable gate array (FPGA) to readout only the hit pixel. This improves timing and energy resolutions, but the resulting boards can be bulky, power hungry and expensive to build. Furthermore, existing readout technology is able to provide only 2-dimensional hit location information.

Thus, there is a need to reduce overall channel count in PET scanners and to provide 3-dimensional hit location to improve line-of-response determination.

SUMMARY

The disclosure is directed toward a method and apparatus of detecting outputs from an array of pixelated scintillators, having a processor configured or programmed to determine which pixelated scintillator within the array had a gamma ray interact therewith based on the outputs in a PET system. More specifically, scintillator light output is coupled using light guides to a light sensor (SiPM or photomultiplier tube) which converts it into an analog electrical signal. This analog electrical signal is processed by frontend electronics, the output of which is sent to a digital processor. Digital and analog signals are sent to the processor for analysis, which calculates the gamma ray energy and hit position respectively. Furthermore, by comparing the relative signal in two sets of light guides, coupled to the top and bottom surfaces of the array, the depth of interaction is determined in the processor, as well.

According to one aspect, a PET scanning system includes a gantry having an opening for receiving a subject to be scanned, and a detector ring positioned to receive gamma rays that emit from the subject, the detector ring including a plurality of detector modules. Each module includes an array of pixelated scintillators, the array includes N rows of pixelated scintillators in a first direction and M columns of pixelated scintillators in a second direction that is approximately orthogonal to the first direction, the array having a generally flat top surface and a generally flat bottom surface. A first set of N light guides is optically coupled to the top surface that accumulate optical signals from the array, and a second set of M light guides optically coupled to the bottom surface that accumulate optical signals from the array, the second set of light guides approximately orthogonal to the first set. Each light guide is coupled to a light sensor which converts optical signals into analog electrical outputs. A processor is coupled to outputs from the first set and the second set, the processor configured to determine which pixelated scintillator within the array had a gamma ray interact therewith, and its depth of interaction, based on the outputs. Thus, gamma ray detection in an array of M×N scintillator pixels is accomplished using only M+N SiPM channels.

According to another aspect, a method of PET imaging includes detecting light from each of a first plurality of light guides, wherein each light guide of the first plurality is optically coupled to a top surface of an array of pixelated scintillators, the array including N rows of pixelated scintillators in a first direction, and M columns of pixelated scintillators in a second direction that is approximately orthogonal with the first direction, and detecting light from each of a second plurality of light guides. Each light guide of the second plurality is optically coupled to a bottom surface of the array of pixelated detectors, and extends in a direction that is approximately orthogonal to the first plurality of light guides. The method further includes accumulating optical signals from each of the first plurality of light guides, and from each of the second plurality of light guides, comparing the accumulated signals, and determining which pixelated scintillator of the array had a gamma ray interact therewith, and a depth of interaction of the interaction of the gamma ray, based on the comparison.

According to yet another aspect, a method of fabricating a PET detector includes providing an array of pixelated scintillators having a generally flat top surface and a generally flat bottom surface, the array including N rows of pixelated scintillators in a first direction and M columns of pixelated scintillators in a second direction that is approximately orthogonal with the first direction, optically coupling a first plurality of light guides to the top surface that each extend in the second direction, optically coupling a second plurality of light guides to the bottom surface that each extend in the first direction, attaching sensors to each of the first plurality of light guides and to each of the second plurality of light guides, the sensors configured to convert optical signals to electrical signals, and coupling processor to each of the sensors, wherein the processor determines, based on the electrical signals from the sensors, which pixelated scintillator within the array had a gamma ray interact therewith as well as a depth of interaction of the gamma ray interaction.

Various other features and advantages will be made apparent from the following detailed description and the drawings.

DETAILED DESCRIPTION

The operating environment of disclosed embodiments is described with respect to a positron emission tomography (PET) system.

Figure 1:
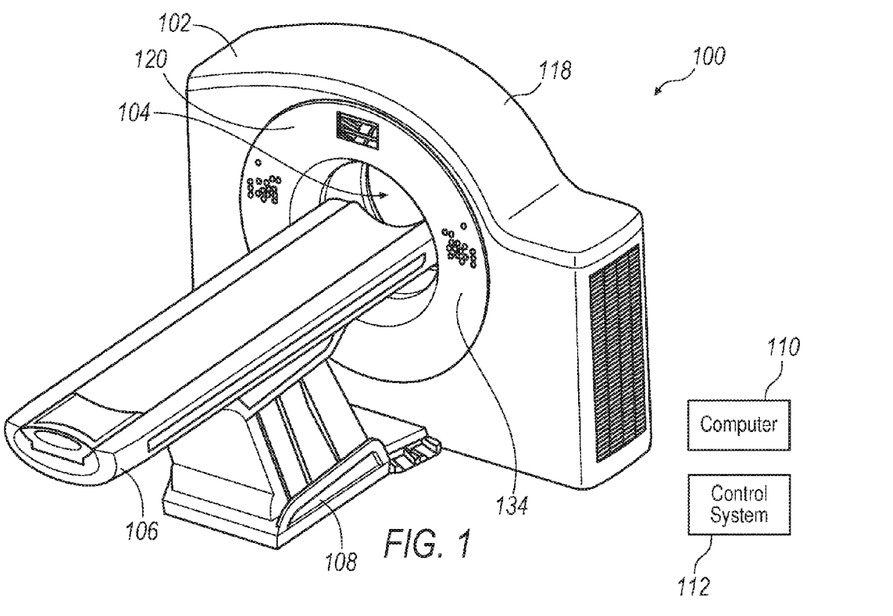
FIG. 1 is a perspective view of a PET imaging system.
Figure 2:
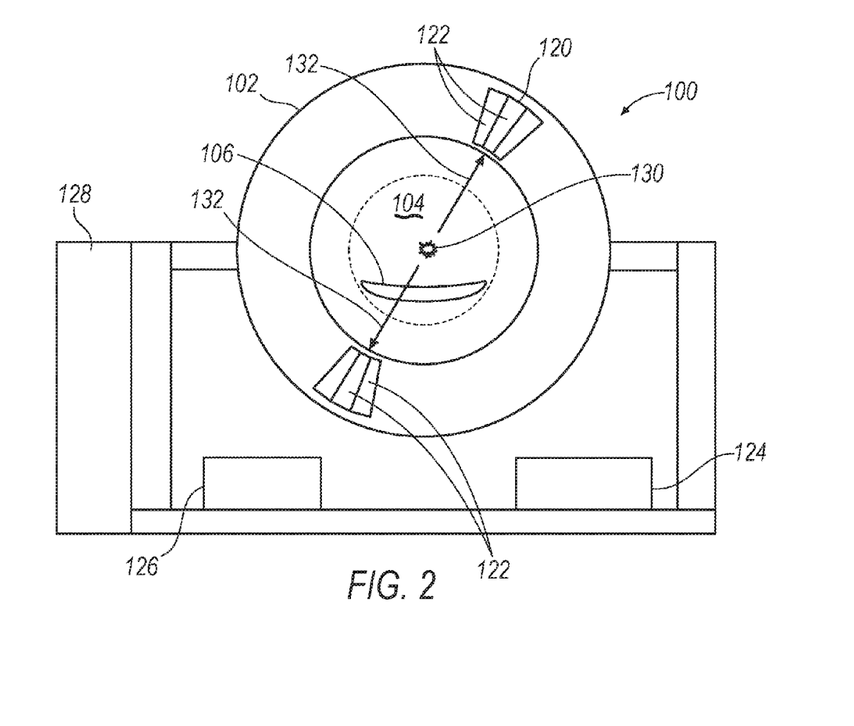
FIG. 2 is a planar cross-section of the system illustrated in FIG. 1.

Referring to FIGS. 1 and 2, a PET system 100 includes a gantry 102 having an opening 104. A patient table 106 is positioned on a support structure 108, and patient table 106 is axially controllable such that a patient (not shown) positioned on table 106 may be positioned within opening 104. A computer system or computing device 110 provides operator instructions and other control instructions to a control system 112. Computer system 110 also may include image reconstruction algorithms, or an image reconstructor may be provided as a separate processing unit. Control system 112 provides control commands for operating table 106. Gantry 102 includes a cover or enclosure 118, which provides for aesthetic improvement, safety, etc. System 100 includes a detector ring 120 of modules of gamma ray detectors 122, some of which are illustrated, which span the circumference of gantry 102. System 100 also includes data acquisition electronics 124, power supplies 126, and a control box 128.

In operation, a short-lived radioactive tracer isotope is injected into a patient (usually into blood circulation). The atoms of the tracer are chemically incorporated into a biologically active molecule. During a waiting period, the active molecules become concentrated in tissues of interest within the patient. In one example, a molecule commonly used is fluorodeoxyglucose (FDG), a sugar, for which the waiting period is typically an hour. Once concentrated in the tissue of interest, the patient is positioned on table 106 with the location of the concentration positioned within opening 104. During a scan, a record of tissue concentration is made as the tracer material decays.

That is, as the radioisotope undergoes positron emission decay (i.e., beta decay), it emits a positron, which is an antiparticle of the electron and having an opposite charge thereof. The positron travels a short distance within the tissue, typically less than 1 mm (dependent on the type of isotope), during which time it loses kinetic energy and can interact with an electron. The electron and positron annihilate 130, which produces a pair of annihilation photons 132 that move in approximately opposite directions. The annihilation photons 132, typically having 511 keV, are detected within gamma ray detectors 122 at approximately 180° apart.

The two gamma photons 132 are detected within a certain coincidence timing window and an image is generated based on the acquired image data. With an appropriate time-resolution of detected pairs of gamma rays, the time-of-flight may be determined for each coincident event, which may be used to determine the location of the annihilation event. Statistics are obtained for many thousands of coincidence events using data acquisition electronics 124. Typically, the coincidence events may be grouped into projection images, called sinograms. Known reconstruction techniques such as filtered back projection (FBP) may be used to reconstruct images from the projection images using computer 110, resulting in a map that shows tissues in which the tracer has become concentrated, which can be interpreted by a physician or radiologist in the context of supporting a diagnosis or treatment for the subject. Gantry 102 may include gantry controls 134 located thereon, for convenient user operation of some of the commands for system 100.

Figure 3:
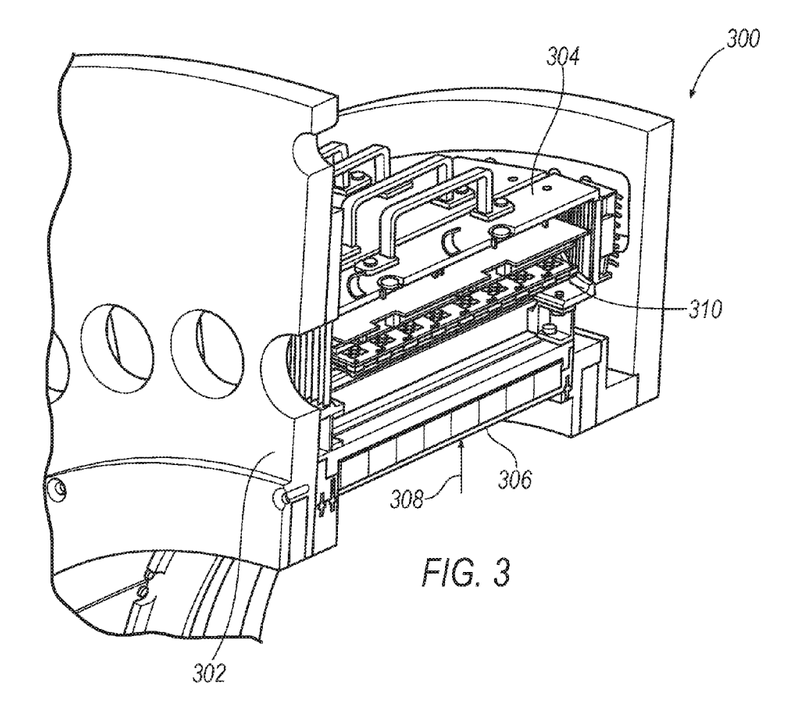
FIG. 3 is a perspective view of a portion of detector ring.

Referring to FIG. 3, a perspective view of a portion of detector ring 120 is illustrated as an assembly 300. Assembly 300 includes a gantry support plate 302 and a detector module housing 304. Gamma ray detectors 306 are positioned to receive, absorb, and detect gamma rays 308 which impinge thereupon, resulting from annihilation events, such as annihilation event 130. Front-end electronics 310 are positioned and configured to receive signals from gamma ray detectors 306. Front-end electronics 310 include a computing device or processor that calculates hit position based on signals received from gamma ray detectors 306.

Figure 4:
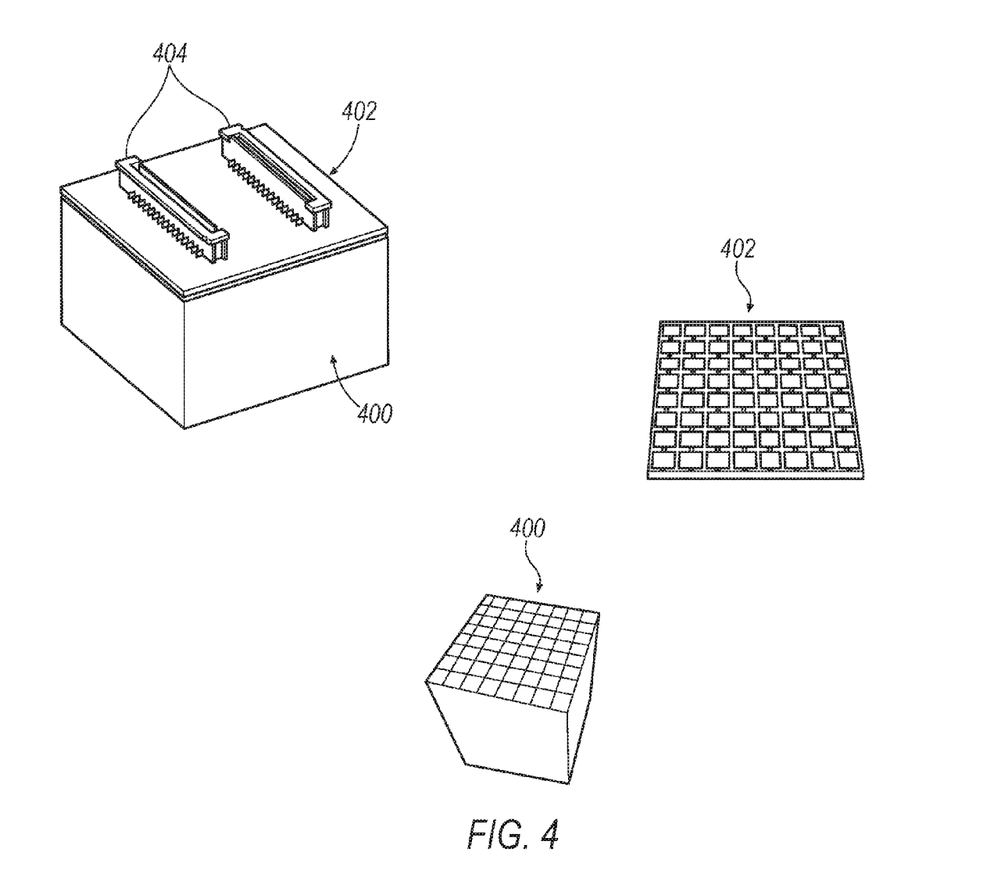
FIG. 4 is an example of a pixelated scintillator material or silicon crystal array.

Referring to FIGS. 3 and 4, modules of gamma ray detectors 122 described include a pixelated scintillator material or scintillator crystal array 400 and a silicon photomultiplier (SiPM) array 402. The scintillator crystal array 400 scintillates (i.e., converts the absorbed energy into light) when a gamma ray photon collides therewith. Light output from the crystal array 400 is converted to an electrical signal in the SiPM array 402, to indicate the 2-dimensional location and total energy and timing of the gamma ray photon. The event information is passed through electrical connectors 404 to front-end electronics 310 of FIG. 3. The event information is further transmitted through a communication link, to include timing, energy, and other relevant information to computer 110.

Figure 5:
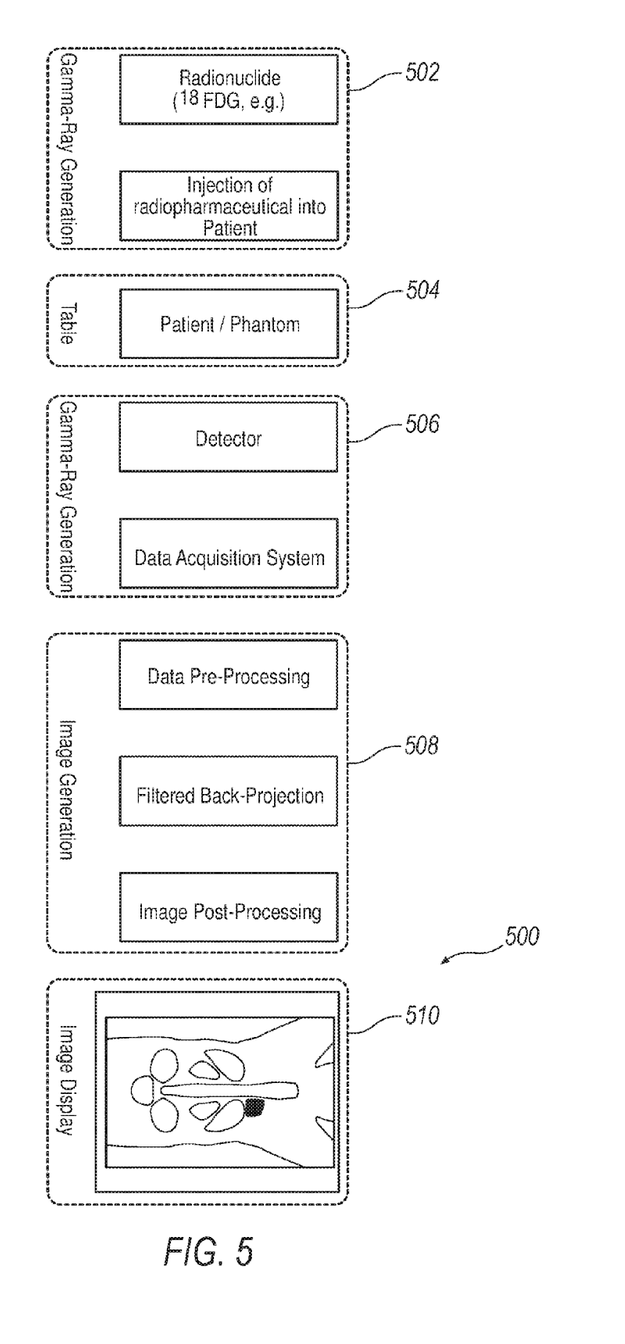
FIG. 5 is an exemplary image chain for a PET imaging system.

FIG. 5 illustrates an exemplary image chain 500, consistent with the operation described above. Gamma ray generation occurs 502, resulting from annihilation events that occur within a subject. Gamma ray generation 502 includes preparation of a radiopharmaceutical that includes a radionuclide such as FDG, and injection of the radiopharmaceutical into the subject. The radionuclide is absorbed by diseased tissues such as a tumor. The subject or patient (or a phantom if conducting calibration or other studies) is positioned on the table at step 504. Gamma ray detection occurs 506 by placement of the subject such that annihilation events occur in desired axial locations with respect to the detector ring, and data acquisition occurs. Image generation occurs in which data is pre-processed, reconstructed (using for example FBP), and image post-processing may be applied. The image is displayed at step 510.

According to the disclosure, channel reduction is achieved by using a light guide to channel light signals from multiple scintillator pixels to a single photosensor, thus avoiding summing up large detector capacitances from multiple photosensors. Further, top/bottom readout allows depth of interaction of the detected gamma ray. As such, not only is the 2-dimensional location of the hit known, but also its depth of interaction based on a comparison of relative signals between top and bottom light guides. The disclosed method and apparatus can be used for any combination of scintillator array and photosensors, its application not limited to the disclosed exemplary detector configurations.

According to the disclosure, FIGS. 6A-6D illustrate various views 600 of an exemplary array of pixelated scintillators that may make up a module 400. Here, optical signals from rows (and columns) of segmented scintillator pixels are guided to a single photosensor using a light-guide. As will be shown, N light-guides are coupled on one surface (top) of an M×N scintillator array to provide the row signals (along the x-axis direction), while on the opposite surface (bottom), another M light-guides are used to couple out the column signals (along the y-axis direction). Furthermore, the ratio of the top and bottom signals allows signal intensity to be determined, and the depth of interaction is determined by comparing the relative signal in two sets of light guides on top and bottom.

Figure 6A:
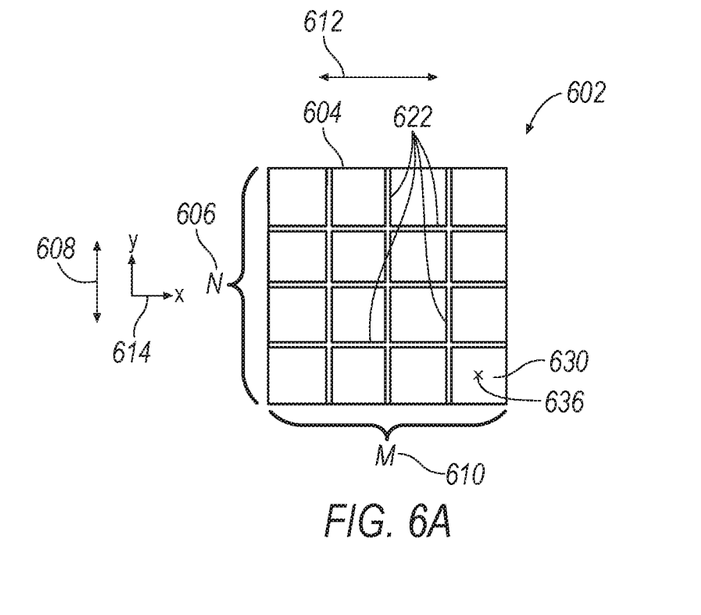
FIGS. 6A-6D illustrate various views of an exemplary array of pixelated scintillators.

FIG. 6A illustrates, in the example, a top view 602 of an array 604 of 4×4 pixels, prior to it having light guides attached thereto, as will be further described. The array 604 includes N rows 606 of pixelated scintillators in a first direction 608, and M columns 610 of pixelated scintillators in a second direction 612 that is orthogonal to the first direction. In the illustrated example, M is equal to 4 and N is equal to 4, thus this example shows a symmetric arrangement for a total of M×N or 4×4=16 pixels formed in a square array. It is contemplated, however, that M need not equal N, and that therefore a rectangular array may also have light guides for readouts, as will be further described. It is also contemplated that more or less than 4 pixelated scintillators may be used in each direction of the array, and that as an example FIG. 4 shows an array of 8×8 that may be implemented according to the disclosure.

Figure 6B:
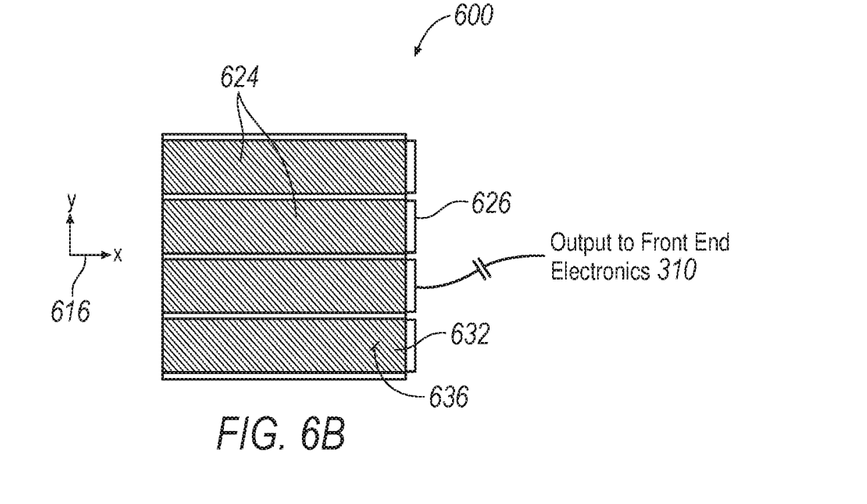
Figure 6C:
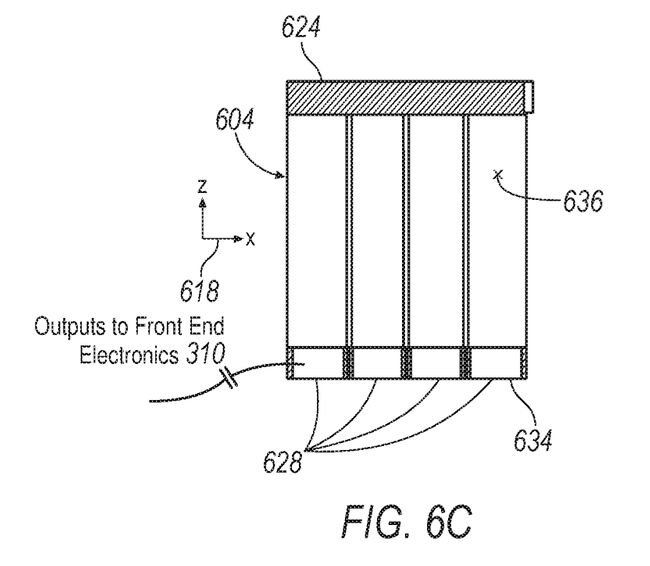
Figure 6D:
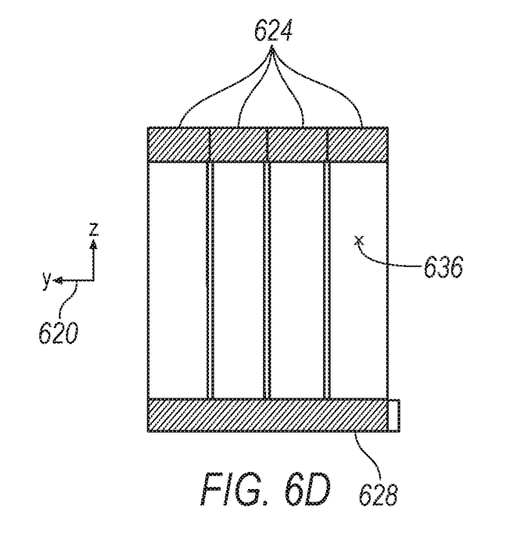

A composite of FIGS. 6A-6D represents a three-dimensional detector that is defined having X, Y, and Z coordinates. More specifically, FIG. 6A shows an X-Y plane 614, FIG. 6B also shows an X-Y plane 616, FIG. 6C shows an X-Z plane 618, and FIG. 6D shows a Y-Z plane 620. Thus, the top or "plan" view 602 of FIG. 6A shows the array 604 having a count of M pixels as M columns 610 extending along the X direction, and a count of N pixels or N rows 606 extending along the Y direction. Thus, direction 608 corresponds with the Y direction as shown in the X-Y plane 614, and direction 612 corresponds with the X direction as also shown in the X-Y plane 614. Also, to reduce or eliminate crosstalk, the pixels include optically isolating or reflecting materials between the pixels 622.

The disclosed array 602 is generally a flat top surface to which light guides are optically coupled. The opposite side of FIG. 6A, the bottom surface as well, is generally flat, and light guides are optically coupled thereto as well. To illustrate, FIG. 6B includes the same X-Y perspective 614 as in FIG. 6A. FIG. 6B, however, further includes a set of light guides 624 that extend in the X direction. Thus, in the example, each light guide (4 illustrated) is optically coupled to 4 pixels, and thus accumulates light signals from any of the 4 pixels to which they are coupled. As also seen in FIG. 6B, outputs 626 are also attached to respective light guides 624. Outputs 626, in one example, are photosensors that each convert an optical signal to an electrical signal, and the photosensors may be silicon photomultipliers (SiPMs). Outputs or light sensors 626 are coupled to a processor, such as in front-end electronics 310, to determine based on signals in the respective light guides, which pixel has been illuminated by a gamma ray, and the depth of interaction of hits that occur within the scintillator of module 400.

FIG. 6C shows a side view of array 604, seen as the X-Z plane 618. Light guides 624 are positioned on the top surface, which correlates with the view of FIGS. 6A and 6B, and thus only one light guide 624 is visible in the view of FIG. 6C, although all 4 are present. FIG. 6C also illustrates light guides 628 on the bottom surface as well and optically coupled to the pixels. Thus, in this example 4 light guides 628 are included that are orthogonal to light guides 624. Correspondingly, FIG. 6D shows the Y-Z plane that shows an end view of the 4 illustrated light guides 624 on the top surface and the 4 light guides orthogonal thereto (only one of which is visible in FIG. 6D). Light guides 628 correspondingly are coupled to front end electronics 310, which are in turn coupled to computer 110.

As such, FIGS. 6A-6D illustrate an array of pixels having light guides on the top surface and extending in a first direction, and the array includes light guides on the bottom surface and extending in a second direction that is orthogonal to the first direction. Thus, each detector module may include a first set of light guides each extending in one direction and arranged side by side along another direction that is orthogonal thereto. A second set of light guides each extend orthogonally to the first set and are arranged side by side, as well. In this example, therefore, the M×N scintillator array includes M light guides in one direction and N light guides on the opposite surface and extending orthogonal to the M light guides. Thus, the number of light guides of the one set corresponds with the N rows in the array, and the number of light guides of the other set corresponds with the M columns in the array.

The light guides may be read, according to the disclosure, having the outputs coupled to light sensors 626 to convert light to electrical signals. Front end electronics 310 are coupled to the outputs, which is then coupled to a computer, such as computer 110 of FIG. 1. The front end electronics 310 determine which pixelated scintillator within the array had a gamma ray interact therewith based on the outputs, and the depth of interaction of hits that occur within the scintillator. Thus, the illustration in FIGS. 6A-6D are for an exemplary 4×4 detector array. The gamma-ray enters the detector along the Z-axis.

More generally, illustrated are light guides 624 that are each optically connected to a respective row of M individual photosensors on one surface, and light guides 628 that are each optically connected to a respective column of N individual photosensors on the other surface. Front end electronics 310 are coupled to photosensors attached to the light guides 624, 628. The front end electronics 310 are thus configured to receive outputs from the light guides 624, 628 (for a total of N+M light guides). The front end electronics 310 determines which pixelated scintillator within array 604 had a gamma ray interaction, based on the outputs, as well as the depth of interaction.

Each of the light guides 624, 628 effectively sums signals from each row 606 having M individual scintillator pixels, and from each column 610 having N individual scintillator pixels. Thus, in operation, when a gamma ray interacts 636 with a pixelated scintillator, one of the N light guides outputs a first amount of light and one of the M light guides outputs a second amount of light. For instance, referring to FIGS. 6A-6D, in one example a pixel 630 receives a gamma ray which interacts 636 with the scintillator therein. In this example, light guide 632 (see FIG. 6B) receives an increased signal or light output, and light guide 634 (see FIG. 6C) receives an increased signal or light output. Accordingly, by recognizing that light guide 632 and light guide 634 both include a detected light signal, pixel 630 may thereby be ascertained as the pixel having received the gamma ray. As such, the processor of front end electronics 310 identifies which row had a light signal, identifies which column had a light signal, and correlates between the identified row and the identified column to determine which pixelated scintillator had the gamma ray interaction, as well as determines a depth of interaction, by comparing the relative signal between the light guides 632, 634.

Thus, referring still to FIG. 6D, when interaction 636 occurs (showed in all FIGS. 6A-6D for reference purposes), scintillator light output is coupled to a light sensor which converts it into an analog electrical signal. This analog electrical signal is processed by frontend electronics, the output of which is sent to a digital processor. Digital and analog signals are sent to the processor for analysis, which calculates the gamma ray energy and hit position. Furthermore, by comparing the relative signal in two sets of light guides, the depth of interaction is determined in the processor, as well.

A simple test apparatus was built to test the disclosed subject matter. A single BGO (commonly bismuth germanium oxide or bismuth germanate) pixel was attached to an end of another identical pixel serving as the light-guide and forming an "L" shaped detector pixel plus light-guide device. The light-guide end was attached to a photosensor and a SiPM mounted on a readout board. A $^{22}$Na radioactive source with gamma emission at 511 keV and 2173 keV was used in a coincidence timing measurement setup, using a single LYSO (Lutetium Yttrium Orthosilicate) pixel as a reference detector. By careful alignment of the components and coincidence detection triggering, the gamma rays were "electronically" collimated to selected locations on the detector pixel. The light attenuation over the full optical path length of the detector pixel plus light guide (maximum 60 mm) was negligible. For this simple setup, satisfactory timing and energy resolution parameters were measured.

One consideration in this design is optimal optical coupling efficiency. The current gamma detector scintillator material of choice (BGO, LYSO, etc.) have indexes of refraction (n) approximately equals 2, while typical optical grease/glue have n~1.6. Thus the choice of light-guide material may need to be around 1.6 as well to optimize light transmission efficiency. The simple test setup demonstrated the potential and validity of the concept, and better light coupling efficiency, and therefore, better timing and energy resolution is expected.

Thus, advantages of the disclosed subject matter are one-to-one readout that eliminates spatial image distortion caused by "Anger-logic" type signal processing. The disclosed apparatus and method also eliminate position-dependent energy resolution across the image plane (the light attenuation effect along the full optical path length is negligible). Top/bottom readout signal ratio allows depth-of-interaction measurement providing three-dimensional coordinates of the gamma interaction location. The disclosed apparatus and method also provide comparable timing and energy resolution at a lower cost with lower power consumption compared to electronics-based channel reduction approaches. The disclosed apparatus and method also significantly reduces the number of photosensors used to read out arrays of detectors.

Other impacts of this disclosure on products such PET scanner are simple design based on standard components will lead to higher volume production yield and reduce time for quality control testing. For an N×N array, cost of photosensors is reduced by a factor of N/2. Low power consumption reduced the cooling requirement, which benefits the customer who may need to provide air-condition rooms to house the scanner. Further, thermal control and management of the detector temperature are simplified. Significantly, an ability to measure depth-of-interaction is a first of its kind in PET scanner technology. It will significantly improve reconstructed image quality.

Thus, disclosed is a method of PET imaging that includes detecting light from each of a first plurality of light guides, wherein each light guide of the first plurality is optically coupled to a top surface of an array of pixelated scintillators, the array including N rows of pixelated scintillators in a first direction, and M columns of pixelated scintillators in a second direction that is approximately orthogonal with the first direction, and detecting light from each of a second plurality of light guides. Each light guide of the second plurality is optically coupled to a bottom surface of the array of pixelated detectors, and extends in a direction that is approximately orthogonal to the first plurality of light guides. The disclosed method further includes accumulating optical signals from each of the first plurality of light guides, and from each of the second plurality of light guides, comparing the accumulated signals, and determining which pixelated scintillator of the array had a gamma ray interact therewith, and a depth of interaction of the interaction of the gamma ray, based on the comparison.

Disclosed also is a method of fabricating a PET detector. The method includes providing an array of pixelated scintillators having a generally flat top surface and a generally flat bottom surface, the array including N rows of pixelated scintillators in a first direction and M columns of pixelated scintillators in a second direction that is approximately orthogonal with the first direction, optically coupling a first plurality of light guides to the top surface that each extend in the second direction, optically coupling a second plurality of light guides to the bottom surface that each extend in the first direction, attaching outputs to each of the first plurality of light guides and to each of the second plurality of light guides, the outputs configured to convert optical signals to electrical signals, and coupling a processor to each of the outputs, wherein the processor determines, based on the electrical signals from the outputs, which pixelated scintillator within the array had a gamma ray interact therewith as well as a depth of interaction of the gamma ray interaction.

An implementation of system 100 in an example comprises a plurality of components such as one or more of electronic components, hardware components, and/or computer software components. An exemplary component of an implementation of the system 100 employs and/or comprises a set and/or series of computer instructions written in or implemented with any of a number of programming languages, as will be appreciated by those skilled in the art, that may be used in a computer or computing device such as device 110 of FIG. 1.

An implementation of system 100 in an example employs one or more computer readable signal bearing media. A computer-readable signal-bearing medium in an example stores software, firmware and/or assembly language for performing one or more portions of one or more implementations. A computer-readable signal-bearing medium for an implementation of the system 100 in an example comprises one or more of a magnetic, electrical, optical, biological, and/or atomic data storage medium. For example, an implementation of the computer-readable signal-bearing medium comprises floppy disks, magnetic tapes, CD-ROMs, DVD-ROMs, hard disk drives, and/or electronic memory. In another example, an implementation of the computer-readable signal-bearing medium comprises a modulated carrier signal transmitted over a network comprising or coupled with an implementation of the system 100, for instance, an internal network, the Internet, a wireless network, and the like.

A technical contribution for the disclosed method and apparatus is that it provides for a processor or computer-implemented apparatus and method of detecting outputs from first and second sets of light guides, the computer programmed to determine which pixelated scintillator within the array had a gamma ray interact therewith based on the outputs.

When introducing elements of various embodiments of the disclosed materials, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

While the preceding discussion is generally provided in the context of medical imaging, it should be appreciated that the present techniques are not limited to such medical contexts. The provision of examples and explanations in such a medical context is to facilitate explanation by providing instances of implementations and applications. The disclosed approaches may also be utilized in other contexts, such as the non-destructive inspection of manufactured parts or goods (i.e., quality control or quality review applications), and/or the non-invasive inspection or imaging techniques.

While the disclosed materials have been described in detail in connection with only a limited number of embodiments, it should be readily understood that the embodiments are not limited to such disclosed embodiments. Rather, that disclosed can be modified to incorporate any number of variations, alterations, substitutions or equivalent arrangements not heretofore described, but which are commensurate with the spirit and scope of the disclosed materials. Additionally, while various embodiments have been described, it is to be understood that disclosed aspects may include only some of the described embodiments. Accordingly, that disclosed is not to be seen as limited by the foregoing description, but is only limited by the scope of the appended claims.

What is claimed is:

1. A PET scanning system comprising:
   a gantry having an opening for receiving a subject to be scanned;
   a detector ring positioned to receive gamma rays that emit from the subject, the detector ring comprising a plurality of detector modules, each module comprising:
   an array of pixelated scintillators, the array comprised of N rows of pixelated scintillators in a first direction and M columns of pixelated scintillators in a second direction that is approximately orthogonal to the first direction, the array having a generally flat top surface and a generally flat bottom surface;
   a first set of light guides optically coupled to the top surface that accumulate optical signals from the array; and a second set of light guides optically coupled to the bottom surface that accumulate optical signals from the array, the second set of light guides approximately orthogonal to the first set; and a processor coupled to outputs from the first set of light guides and the second set of light guides, the processor configured to determine which pixel in the pixelated scintillator within the array had a gamma ray interact therewith, and its depth of interaction in the pixel, based on the outputs from the first set of light guides that are optically coupled to the top surface of the array of pixelated scintillators, and based on the outputs from the second set of light guides that are optically coupled to the bottom surface of the array of pixelated scintillators.

2. The PET system of claim 1, wherein each module further comprises:

the first set of light guides each extending in the second direction and arranged side by side along the first direction; and the second set of light guides each extending in the first direction and arranged side by side along the second direction.

3. The PET system of claim 2, wherein the first set of light guides is N light guides.

4. The PET system of claim 2, wherein the second set of light guides is M light guides.

5. The PET system of claim 1, wherein M equals N.

6. The PET system of claim 5, wherein each module forms a square.

7. The PET system of claim 1, wherein M is not equal to N.

8. The PET system of 1, wherein the outputs to the processor are photosensors that each converts an optical signal to an electrical signal.

9. The PET system of claim 8, wherein the photosensor is a silicon photomultiplier (SiPM).

10. The PET system of claim 1, wherein the number of light guides of the first set corresponds with the N rows in the array, and the number of light guides of the second set corresponds with the M rows in the array.

11. A method of PET imaging, comprising:

detecting light from each of a first plurality of light guides, wherein each light guide of the first plurality is optically coupled to a top surface of an array of pixelated scintillators, the array including N rows of pixelated scintillators in a first direction, and M columns of pixelated scintillators in a second direction that is approximately orthogonal with the first direction;

detecting light from each of a second plurality of light guides, wherein each light guide of the second plurality:

is optically coupled to a bottom surface of the array of pixelated detectors; and extends in a direction that is approximately orthogonal to the first plurality of light guides;

accumulating optical signals from each of the first plurality of light guides that is optically coupled to the top surface of the array of pixelated scintillators, and from each of the second plurality of light guides that is optically coupled to the bottom surface of the array of pixelated scintillators;

comparing the accumulated signals, and determining which pixel in a pixelated scintillator of the array had a gamma ray interact therewith, and a depth of interaction of the interaction of the gamma ray in the pixel, based on the comparison of accumulated optical signals from the top surface of the array of pixelated scintillators and from the bottom surface of the array of pixelated scintillators.

12. The method of claim 11, wherein each array further comprises:

the first set of light guides each extending in the second direction and arranged side by side along the first direction; and the second set of light guides each extending in the first direction and arranged side by side along the second direction.

13. The method of claim 12, wherein the first set of light guides is N light guides, and the second set of light guides is M light guides.

14. The method of claim 11, wherein M equals N.

15. A method of fabricating a PET detector, comprising:

providing an array of pixelated scintillators having a generally flat top surface and a generally flat bottom surface, the array including N rows of pixelated scintillators in a first direction and M columns of pixelated scintillators in a second direction that is approximately orthogonal with the first direction;

optically coupling a first plurality of light guides to the top surface that each extend in the second direction;

optically coupling a second plurality of light guides to the bottom surface that each extend in the first direction;

attaching sensors to each of the first plurality of light guides and to each of the second plurality of light guides, the sensors configured to convert optical signals to electrical signals; and coupling a processor to each of the sensors, wherein the processor determines, based on the electrical signals from the sensors, which pixelated scintillator within the array had a gamma ray interact therewith as well as a depth of interaction of the gamma ray interaction in the pixelated scintillator, based on outputs from the first plurality of light guides that are optically coupled to the to surface of the array of pixelated scintillators, and based on outputs from the second plurality of light guides that are optically coupled to the bottom surface of the array of pixelated scintillators.

16. The method of claim 15, wherein:

optically coupling the first plurality of light guides further comprises arranging the first plurality of light guides side by side along the first direction; and optically coupling the second plurality of light guides further comprises arranging the second plurality of light guides side by side along the second direction.

17. The method of claim 16, wherein the first plurality of light guides is N light guides, and the second set of light guides is M light guides.

18. The method of claim 15, wherein M equals N.

19. The method of claim 15, wherein:

attaching the sensors to each of the first plurality of light guides further comprises attaching silicon photomultipliers (SiPMs); and attaching the sensors to each of the second plurality of light guides further comprises attaching SiPMs.

20. The method of claim 15, wherein the number of light guides of the first plurality corresponds with the N rows in the array, and the number of light guides of the second plurality corresponds with the M columns in the array.

* * * * *